(12) United States Patent
Bichler

(10) Patent No.: US 11,703,166 B2
(45) Date of Patent: Jul. 18, 2023

(54) PIPE SEAL, PIPE ASSEMBLY, AND METHOD FOR FORMING A PIPE ASSEMBLY AND A SEAL

(71) Applicant: Trelleborg Pipe Seals Lelystad B.V., NJ Lelystad (NL)

(72) Inventor: Andreas Bichler, Ebbs (AT)

( * ) Notice: Subject to any disclaimer, the term of this patent is extended or adjusted under 35 U.S.C. 154(b) by 1118 days.

(21) Appl. No.: 16/342,707

(22) PCT Filed: Oct. 18, 2017

(86) PCT No.: PCT/EP2017/076647
§ 371 (c)(1),
(2) Date: Apr. 17, 2019

(87) PCT Pub. No.: WO2019/076455
PCT Pub. Date: Apr. 25, 2019

(65) Prior Publication Data
US 2022/0003342 A1 Jan. 6, 2022

(51) Int. Cl.
| F16J 15/10 | (2006.01) |
| F16L 21/03 | (2006.01) |
| B29C 45/14 | (2006.01) |
| B29L 31/26 | (2006.01) |

(52) U.S. Cl.
CPC ........ F16L 21/03 (2013.01); B29C 45/14065 (2013.01); *B29L 2031/26* (2013.01); *F16J 15/104* (2013.01)

(58) Field of Classification Search
CPC .... F16J 15/104; F16J 15/108; B29L 2031/26; B29C 45/14065; F16L 21/03
See application file for complete search history.

(56) References Cited

U.S. PATENT DOCUMENTS

| 2,210,833 A | * | 8/1940 | Clough ................. F16L 21/035 |
| | | | 138/119 |
| 3,445,120 A | | 5/1969 | Barr |
| 4,030,872 A | | 6/1977 | Parmann |

(Continued)

FOREIGN PATENT DOCUMENTS

| CN | 1342250 A | 3/2002 |
| CN | 105492815 A | 4/2016 |

(Continued)

OTHER PUBLICATIONS

Notification of Transmittal of the International Search Report and The Written Opinion of the International Searching Authority, or the Declaration in corresponding International Application No. PCT/EP2017/076647 dated Dec. 7, 2017.

(Continued)

*Primary Examiner* — Gilbert Y Lee
(74) *Attorney, Agent, or Firm* — Timothy W. Menasco, Esq.; Harter Secrest & Emery LLP

(57) ABSTRACT

The invention refers to a pipe seal suitable for use in a Rieber joint, the seal (14) comprising an annular sealing member (18) and an annular reinforcing member (20) completely embedded in the sealing member (18). The reinforcing member (20) is made of a rigid plastic band and the reinforcing member (20) includes, for increasing an area of contact between the sealing member (18) and the reinforcing member (20), at least one protrusion (24) and/or at least one recess (26).

13 Claims, 7 Drawing Sheets

(56) References Cited

U.S. PATENT DOCUMENTS

| | | | | |
|---|---|---|---|---|
| 4,299,412 | A | * | 11/1981 | Parmann ............... F16L 17/032 |
| | | | | 285/260 |
| 6,113,159 | A | | 9/2000 | Corbett, Jr. |
| 9,085,101 | B2 | * | 7/2015 | Guzowski ............... F16L 21/03 |
| 2006/0181031 | A1 | * | 8/2006 | Corbett .................. F16L 21/03 |
| | | | | 277/616 |
| 2009/0200705 | A1 | | 8/2009 | Mora |
| 2012/0049409 | A1 | | 3/2012 | Guzowski |
| 2016/0223109 | A1 | * | 8/2016 | Lopez-Chaves ........ F16L 21/03 |
| 2018/0031157 | A1 | * | 2/2018 | Copeland ............... B21D 39/04 |

FOREIGN PATENT DOCUMENTS

| | | |
|---|---|---|
| DE | 102013217811 A1 | 3/2015 |
| GB | 1112605 | 5/1968 |

OTHER PUBLICATIONS

Written Opinion of the International Searching Authority corresponding to International Application No. PCT/EP2017/076647.
Office Action and Search Report issued by the Chinese Patent Office in corresponding CN Application No. 201780021283.X dated May 19, 2021 (22 pages).

\* cited by examiner

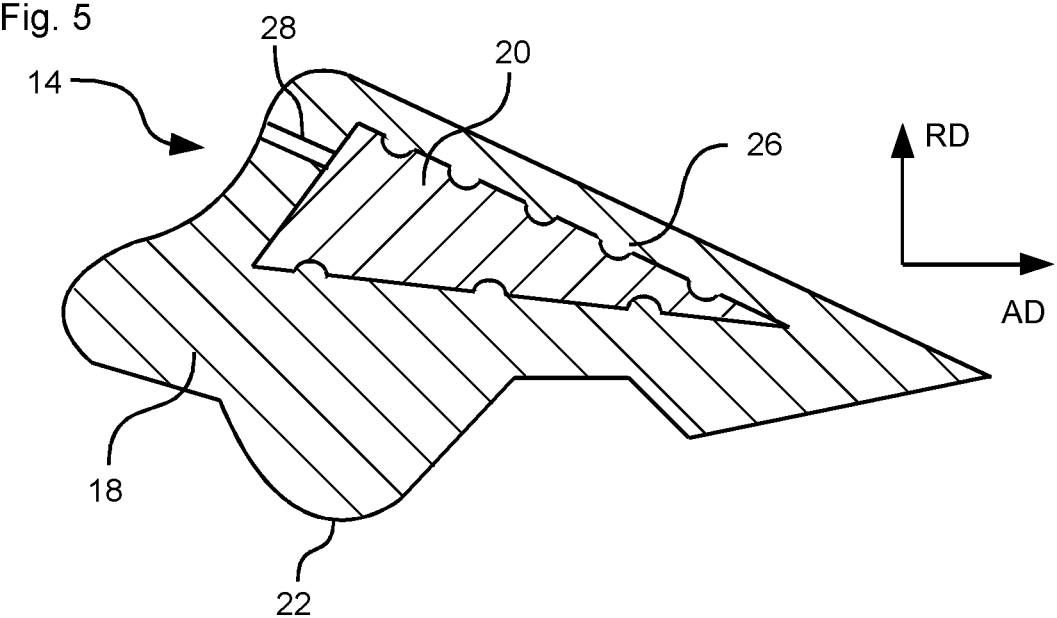
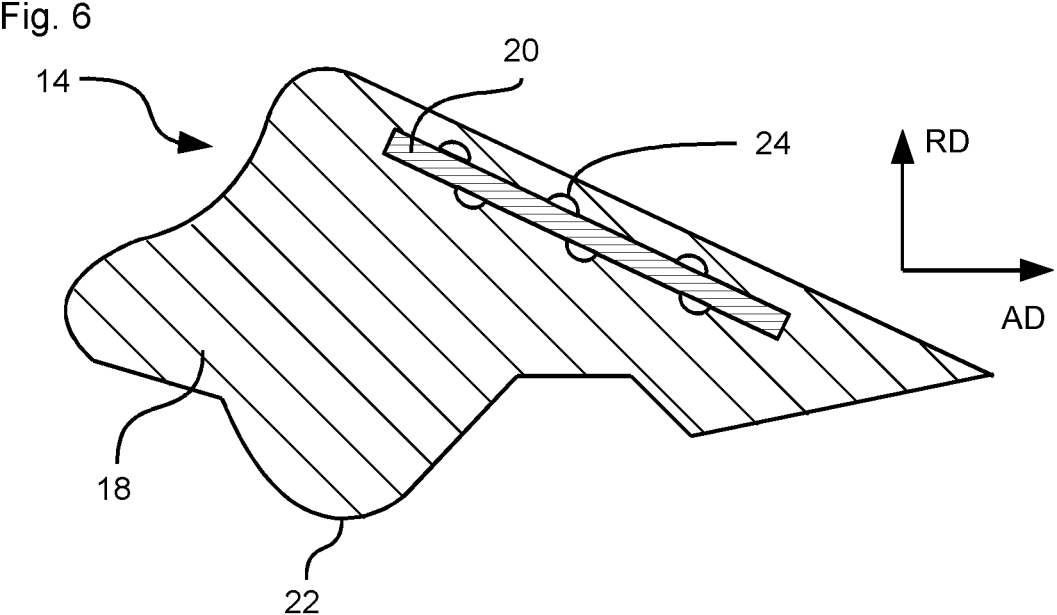

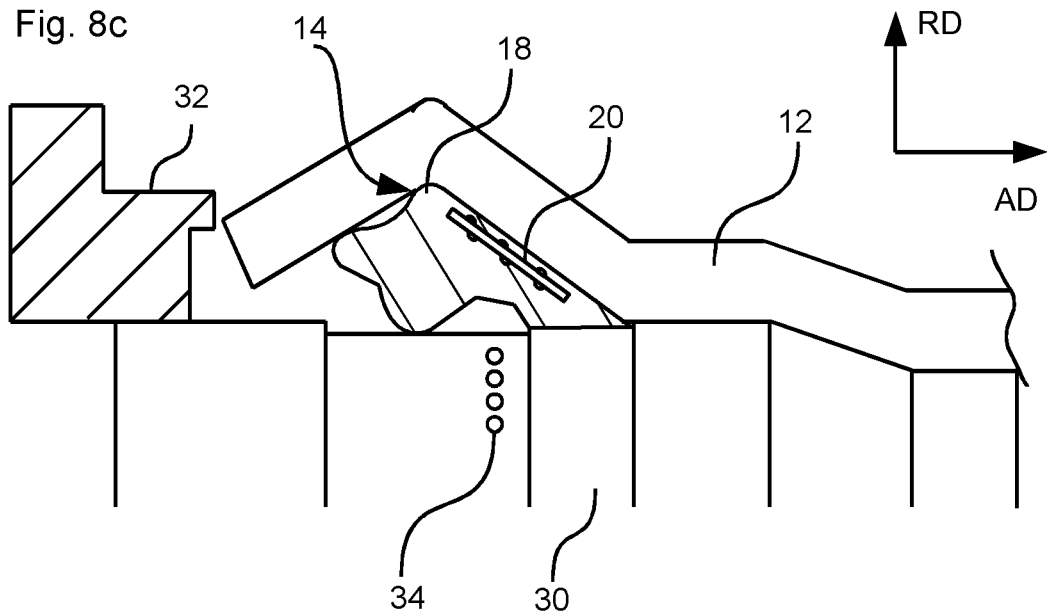
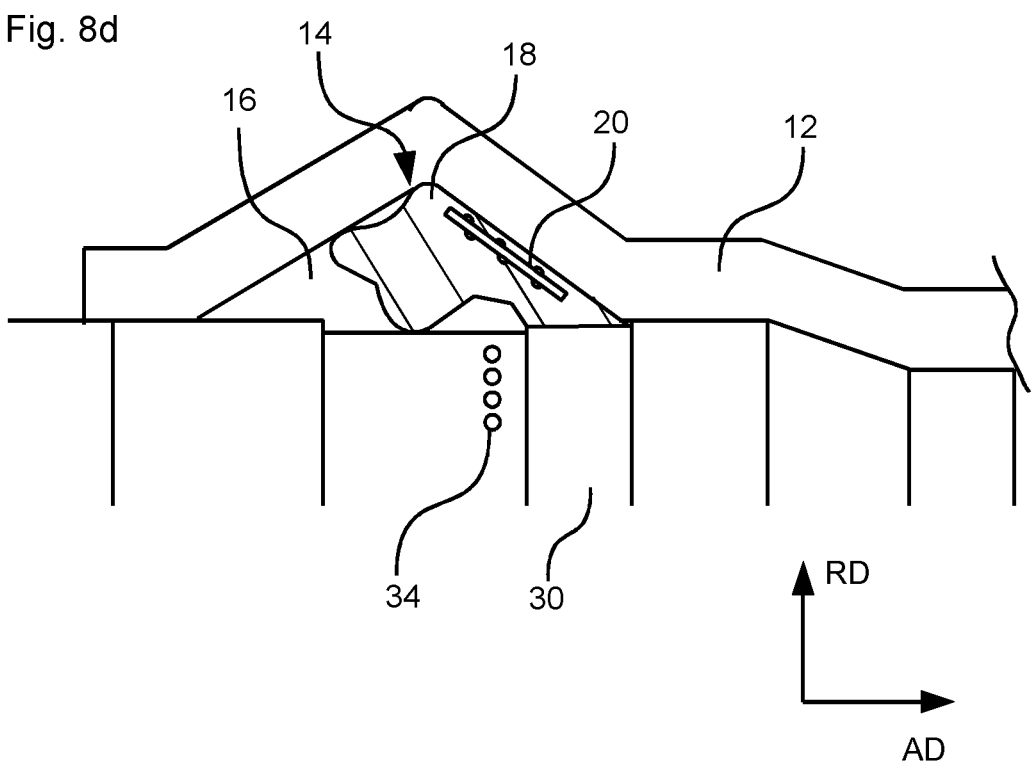

PIPE SEAL, PIPE ASSEMBLY, AND METHOD FOR FORMING A PIPE ASSEMBLY AND A SEAL

The present invention relates to a pipe seal suitable for use in a Rieber joint. The seal comprises an annular sealing member and an annular reinforcing member. Furthermore, the invention refers to a pipe assembly comprising the seal and a pipe having an annular groove in which the seal is located. The invention further refers to a method for forming a pipe assembly and a method for manufacturing a seal suitable for use in a Rieber joint.

The jointing of municipal pipelines is often executed using a rubber sealing ring seated in the pipe bell to effectively prevent leakage between two adjoining pieces of pipe after the spigot (male end) has been inserted into the bell (female end). Known gasket rings were homogeneous, non-reinforced and flexible and were manually installed into a pre-belled pipe either at the construction site or the manufacturing facility.

Recently, pipe seals were developed as "locked-in" or self-restraining gaskets, often referred to them as Rieber joints. The Rieber gasket is reinforced with an additional external or internal steel ring and is placed into the bell during the belling process. This permanent reinforced seal provides structural support and pre-compression of the rubber ring against the pipe. Advantages for the installer are increased variability and reduced likelihood of dislodgement of the gasket ring from the bell groove during insertion of the spigot into the bell of adjoining pieces of pipe.

The objective of the present invention is to provide a pipe seal suitable for use in a Rieber joint, a pipe assembly, a method for manufacturing a seal suitable for use in a Rieber joint, and a method forming a pipe assembly which have improved characteristics.

The objective is solved by the pipe seal according to claim 1, the pipe assembly according to claim 11, the method for forming a pipe assembly according to claim 12 and the method for manufacturing a seal suitable for use in a Rieber joint according to claim 13. The depending claims describe preferred embodiments of the invention.

A pipe seal is suitable for use in a Rieber joint. The seal comprises an annular sealing member and an annular reinforcing member which is completely embedded in the sealing member. The reinforcing member is made of a rigid plastic band. For increasing an area of contact between the sealing member and the reinforcing member, the reinforcing member includes at least one protrusion and/or at least one recess.

A pipe assembly comprises the seal as described above and a pipe having an annular groove in which the seal is located.

An advantage of the invention is that the pipe seal is free from metals as the reinforcing member is not made from metal as in the prior art, but from a plastic band. Hence, the risk that lead (Pb) leaks from the reinforcing member of the seal is eliminated. Furthermore, due to the provision of the protrusion and/or the recess, the area of contact between the sealing member and the reinforcing member is increased. Hence, a reliable adhesion of the sealing member to the reinforcing member can be provided. The enlarged area of adhesion provides increased stability for the sealing member such that the sealing performance can be improved. For example, the strength of contact between the sealing member and the pipe can be increased due to the increased strength of adhesion since the sealing member is better supported by the reinforcing member. In addition, the better reinforcement of the sealing member reduces the risk that the sealing member is rotated during the insertion of the second pipe. Hence, the seal is more likely to remain ideally placed in the groove.

Furthermore, special rubber-to-metal bonding adhesives providing a strong cohesion of the metallic ring and the sealing member as used in the prior art need not to be employed, since the strong adhesion between the sealing member and the reinforcing member is provided by the increased area of contact. In particular, a bonding agent to increase the adhesion of the sealing member to the reinforcing member is not used with the seal according to this invention. Hence, the manufacturing process of the pipe seal can be simplified and costs can be reduced.

The pipe may be called first pipe and regarded as a female pipe, a pipe fitting, or a pipe having a bell end. A second pipe may be constituted by a male pipe, a pipe fitting, or spigot end. The second pipe is intended to be inserted into the first pipe, in particular into the bell end of the first pipe. The two concentric pipes may be plastic pipes, such as PVC pipes. However, the pipes may be made from high or medium density polyethylene (HDPE, MDPE), polypropylene (PP), or polybutylene (PB).

The groove in the first pipe is preformed, preferably during the belling process in which also the seal is simultaneously positioned in the groove. The groove is arranged in the pipe wall of the first pipe; in particular the groove is formed by a contour of the pipe wall. For example, the pipe wall has an outer exterior surface having a shape similar to the groove, i.e. an inner surface of the pipe follows the contour of the outer surface providing a constant thickness of the pipe even at the location of the groove.

The groove may have a rectangular shape, but preferably, a triangular shape in a cross-sectional view of the groove. For example, the groove has a first side wall and a second side wall which may be inclined to a radial direction. The groove is open to an inside of the first pipe such that the seal can contact the second pipe if the second pipe is inserted into the first pipe. The seal seals an inner surface of the first pipe to an outer surface of the second pipe.

The seal is an annular or ring-shaped seal; preferably the seal is uninterrupted. The seal may be called a gasket. The seal may have a diameter which is adapted to the diameter of the pipe and the groove, respectively. Hence, various seals having different diameter can be employed for different pipes.

The reinforcing member is intended for providing the rigidity of the seal. The reinforcing member is, for example, made of a non-elastomeric, substantially non-flexible, or rigid material, such as plastic. Since the reinforcing member is made of plastic, the reinforcing member, albeit being rigid, is still flexible enough to be adaptable to pressure applied to the seal or to deformations of the pipe due to pressure in the pipe. This is a further advantage compared to a reinforcing member made of metal as used in the prior art which does not provide the flexibility of a plastic reinforcing member. The reinforcing member may be more deformable or ductile than a similar reinforcing member made of metal.

The elastic modulus, the IHRD hardness, or the shore A hardness of the reinforcing member is greater than the corresponding hardness of the sealing member. For example, the shore A hardness of the reinforcing member is at least 90 or at least 100, whereas the shore A hardness of the sealing member is between 40 and 80, more preferably between 50 and 70 and most preferably about 55. The reinforcing member may be made of thermoplastic materials which include polyolefin, such as polyethylene or polypropylene (polyvinylchloride PVC) and like materials. Furthermore, the reinforcing member may be made from polyamide.

The reinforcing member is completely embedded in the sealing member. This means that the reinforcing member is completely surrounded by the sealing member. The reinforcing member is not visible from the outside of the seal. The reinforcing member is preferably continuous in a circumferential direction. For example, the reinforcing member is free from discontinuities in the circumferential direction.

The sealing member is intended to provide the sealing capability of the sealing. To this end, the sealing member has a lower hardness than the reinforcing member, such that the sealing member can better adapt its contour to the shape of the groove. The sealing member may include elastomers, natural and synthetic rubbers, including, for example, CR (chloroprene) SBR (styrene-butadiene rubber), EPDM (ethylene propylene diene monomer (M-class) rubber), NBR (Nitrile butadiene rubber), nitrile rubber, fluoroelastomers, such as perfluoroelastomers, tetrafluoroethylene-propylene rubbers (FEPM) or an elastomer sold under the name of Viton®. Furthermore, the sealing member may be made from thermoplastic elastomers (TPE) or thermoplastic vulcanizates (TPV or TPE-V).

The radial direction of the seal extends in a direction of the diameter the seal. The circumferential direction is perpendicular to the radial direction and extends along the circumference of the seal. An axial direction is perpendicular to both the radial direction and the circumferential direction.

The seal may be used instead of conventional gaskets for Rieber joints in which a metal ring provides stability. The stability of the seal is provided by the reinforcing member which is achieved by the rigidity of the plastic band. The band may have a circular cross-section. However, it is preferred, that the band has a cross-section that deviates from a circle, i.e. the band has at least two diameters which differ. For example, the band has an ellipsoid or oval shape in the cross-sectional view.

In a preferred embodiment, the reinforcing member has a triangular shape or a rectangular shape in a cross-sectional view of the seal. Furthermore, the reinforcing member may have rounded edges in a cross-sectional view.

The area of contact is increased by providing at least one protrusion or at least one recess. The protrusion and/or recess may extend along the circumferential direction of the reinforcing member. However, it is also possible that the protrusion and/or recess only partly extend along the circumferential direction, for example the protrusion and/or recess are interrupted at one or more locations along the circumference of the reinforcing member. The protrusion and/or the recess may have a similar length in the radial direction and circumferential direction. The protrusions may have an identical height or varying height. Similarly, the recesses may have an identical depth or varying depth. The recess may be configured as a hole which completely extends through the reinforcing member. Hence, the reinforcing member may be constituted as a perforated band.

It is possible that only protrusions, only recesses, or a combination thereof are provided with the reinforcing member. The protrusion can be configured as ribs extending along the circumference. The recess may be configured as a crack extending along the circumferential direction. The protrusion and/or the recess may have any shape in a cross-sectional view. For example, the protrusion and/or the recess may have a triangular shape, a rectangular shape, or a semi-circle shape in a cross-sectional view.

In a preferred embodiment, the protrusion comprises at least one nub. The nubs may be randomly or evenly distributed on the reinforcing member. The nub may have a circular shape in a plan view on the nub.

In a preferred embodiment, the protrusion and/or the recess are arranged on two opposing side walls of the reinforcing member. For example, if the reinforcing member has a rectangular shape in a cross-sectional view, the two opposing sides are provided with the protrusions. It is, however, possible that only one side or all sides of the reinforcing member are provided with the protrusion and/or the recess. For example, it is possible that one side wall of the reinforcing member is provided with the protrusion and another side is solely provided with the recess.

In a preferred embodiment, the recess is formed by a cut-out at an edge of the reinforcing member. For example, the cut-outs are equally distributed along the circumference of the reinforcing member. The cut-outs may be placed at a radially inner edge of the reinforcing member and/or at a radially outer edge of the reinforcing member. The cut-outs may be manufactured during the molding process of the reinforcing member. However, it is possible that the cut-outs are stamped out from the reinforcing member in a separate step.

In a preferred embodiment, the protrusions and the reinforcing member are formed as a one-piece unit. The protrusions and the reinforcing member are a unitary unit. For example, the protrusions and the reinforcing member may be made in one molding process. However, it is possible that the protrusions may be made from a different material compared to the reinforcing member. For example, the protrusions are bonded to the reinforcing member in a separate step.

In a preferred embodiment, the reinforcing member has a surface that at least partially extends along an exterior surface of the sealing member.

This means that at least one portion of the surface of the reinforcing member has a constant distance to at least a portion of the exterior surface of the sealing member. For example, the sealing member has a flat surface to which the surface of the reinforcing member runs parallel. In this case, protrusions on the surface may be neglected, i.e. the reinforcing member defines a plane to which the exterior surface of the sealing member runs parallel. For example, the exterior surface of the sealing member is that surface over which the pipe is pushed during the belling process. In this case, the reinforcing member provides a strong reinforcement against the force applied by pushing the pipe over the seal such that it can be ensured that the seal is correctly positioned within the groove and the groove is properly formed.

The distance between the surface of the reinforcing member and the portion of the exterior surface of the sealing member is preferably adapted to the requirements of the seal, for example to the shape of the sealing member or the rigidity of the reinforcing member. A short distance between the surface of the reinforcing member and the portion of the exterior surface of the sealing member increases the strength of the seal against the forces occurring during the belling process whereas an increased distance between the surface of the reinforcing member and the portion of the exterior surface of the sealing member (the reinforcing member is arranged in the middle of the sealing member) provides an improved overall support of the sealing member.

In a preferred embodiment, the seal comprises at least one positioning device for positioning the reinforcing member in a mold, wherein preferably the positioning device extends from the reinforcing member to an exterior surface of the sealing member.

The positioning device may be provided for positioning the reinforcing member in the mold, in particular in a circumferential recess of the mold, during the manufacturing of the seal. The positioning device may not serve any purpose once the seal is manufactured. In the understanding of this disclosure, the positioning device is not a part of the reinforcing member. The positioning device may be visible from the outside, i.e. the positioning device is not completely embedded in the sealing member. The positioning device may be made of any material that can withstand the temperature during the molding process.

The positioning device helps to position the reinforcing member in the mold such that the liquefied material of the sealing member can flow completely around the reinforcing member such that the reinforcing member is completely embedded in the sealing member. The positioning device positions the reinforcing member in the mold in such a way that the reinforcing member does not contact the mold.

In a preferred embodiment, the positioning device comprises at least three positioning units preferably having a rod shape. Three positioning units ensure that the reinforcing member is properly seated within the mold as three points define a plane. To this end, the positioning unit has a rod shape, whereby the rods of the positioning units extend from the mold to the reinforcing member. The positioning units may be fixed to the reinforcing member.

It is, however, possible that the positioning device is an annular member that positions the reinforcing member in the mold.

In a preferred embodiment, the positioning device is integrally formed with the reinforcing member. This means that the positioning device and the reinforcing member are a one-piece unit. For example, the positioning device and the reinforcing member are manufactured during one molding process.

A method for forming a pipe assembly comprises the steps of providing a mandrel having an outer working surface, positioning a seal as described above on the working surface, heating a socket end of the plastic pipe, forcing the heated socket end of the plastic pipe over the seal positioned on the working surface such that the heated socket end of the plastic pipe flows over the seal for forming a retention groove for retaining the seal, cooling the heated socket end of the plastic pipe, and removing the mandrel from the cooled socket end of the plastic pipe.

Advantageously, commonly known methods for forming a pipe assembly for forming a Rieber style pipe joint may be used. One major difference to the prior art is that not a metal wire reinforced seal is used, but the seal as described above.

As commonly known, the seal is provided on a mandrel, and in particular on an outer working surface of the mandrel. The step of heating the socket end of the plastic pipe may be achieved by heating the mandrel on which the plastic pipe is already partly pushed over. The temperature of the heating is such that the pipe end changes its hardness from solid to gel-like, i.e. the heated end of the plastic pipe becomes moldable. As known from the prior art, the heated end of the plastic pipe is pushed over the seal in order to simultaneously form the retention groove for retaining the seal and the bell end of the pipe. To this end, a backup collar may be positioned in the mandrel for holding the seal at its location on the working surface when the heated socket end of the plastic pipe is pushed over the seal. After pushing the heated socket end of the plastic pipe over the seal, the backup collar may be removed. The heated socket end of the plastic pipe may be cooled by spraying a liquid, such as water, on the heated plastic pipe. As a last step the mandrel is removed from the cooled socket end of the female plastic pipe. Due to the Rieber style manufacture process, the seal is fixed in the groove of the plastic pipe and is pre-compressed against the pipe wall.

A method for manufacturing a seal suitable for use in a Rieber joint comprises the steps of providing a first mold having a first mold face with a circumferential recess, placing a reinforcing member made of a rigid plastic band in the circumferential recess such that there is a gap between the reinforcing member and the circumferential recess, wherein the reinforcing member includes at least one protrusion and/or at least one recess, providing a second mold having second mating mold face, uniting the first and second mold faces, injecting a material of sealing member into the circumferential recess, applying heat and/or pressure to the mold to form an annular sealing member in which the reinforcing member is fully embedded.

The method for manufacturing a seal generates a seal as described above. The first mold and the second mold preferably each have a circumferential recess, wherein the shape of the circumferential recesses corresponds to the shape of the sealing member. The first mold and the second mold are united at the first and second mold face, respectively, in order to form a space completely surrounded by the first mold and the second mold such that liquefied material of the sealing member can be injected with high pressure in the space formed by the first and second mold.

The rigid plastic band preferably has the characteristics as described above. The positioning of the rigid plastic band in the circumferential recess is such that the rigid plastic band does not contact the circumferential recess. This leads to a sealing member in which the reinforcing member is completely embedded within the sealing member. The positioning of the reinforcing member in the circumferential recess may be achieved by providing positioning means within the circumferential recess such as small webs or ligaments on which the reinforcing member is placed. The positioning means may be a unitary unit with the first mold and/or the second mold.

The sealing member is cured by applying heat and/or pressure to the first and second mold. After cooling the first and second mold, the first and second molds are removed for removing the sealing member from the molds.

In a preferred embodiment, the step of placing the reinforcing member in the circumferential recess is executed by providing at least one positioning device in the circumferential recess on which the positioning device lies in the circumferential recess. The positioning device may be configured as described above. If the positioning device is fixed to or formed as an unitary unit with the reinforcing member, the step of placing the reinforcing member in the circumferential recess is simplified since the reinforcing member needs only be placed in the circumferential recess, whereby the reinforcing member does not contact the first mold due to the positioning device.

Several embodiments of the invention will be discussed in conjunction with the accompanying drawings.

FIG. 5 shows a cross-sectional view of a seal according to another embodiment;

FIG. 6 shows a cross-sectional view of a seal according to yet another embodiment;

FIGS. 8a to 8e show steps for manufacturing a pipe assembly in a partial cross-sectional view.

Figure 8E:
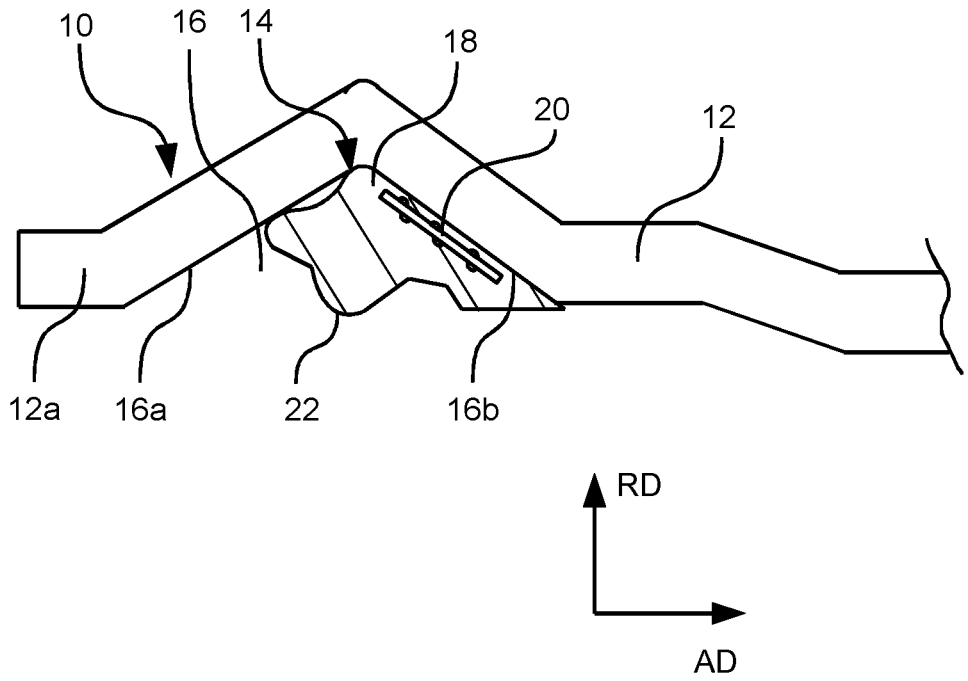

FIG. 8e shows a partial cross-sectional view of a pipe assembly 10. The pipe assembly 10 may be part of a Rieber joint and comprises a pipe 12 having a bell end 12a and a seal 14. The bell end 12a may be regarded as a socket end. The pipe 12 has a groove 16 in which the seal 14 is located. The groove 16 has a triangular shape in a cross-sectional view and comprises a first side wall 16a and a second side wall 16b. The groove 16 extends along the circumference of the pipe 12.

Figure 1:
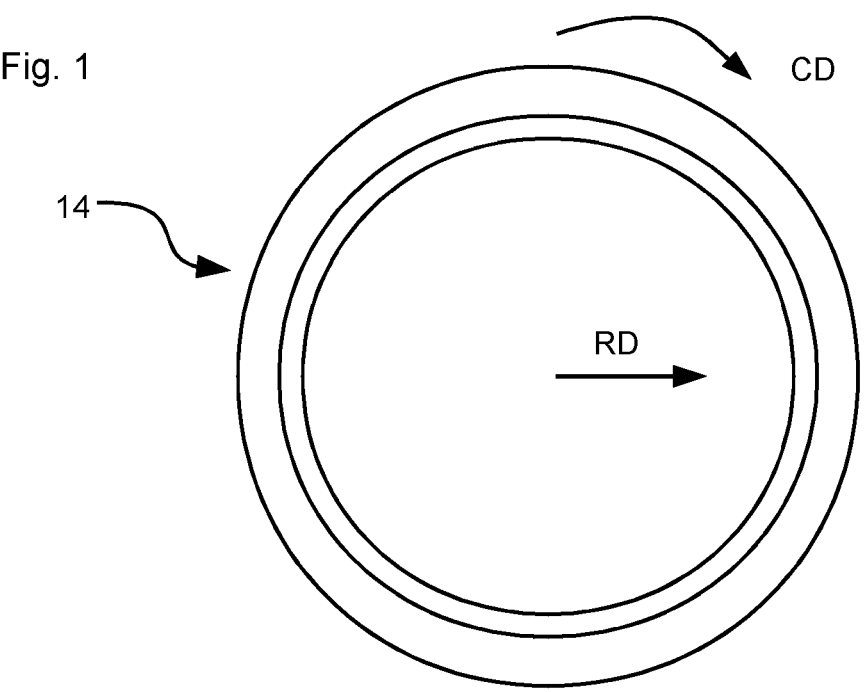
FIG. 1 shows a plan view of a seal along an axial direction.

The seal 14 has an annular shape as shown in FIG. 1. The seal 14 comprises a sealing member 18 and a reinforcing member 20. The sealing member 18 comprises various sealing lips 22. The sealing member 18 is made of a rubber-like material.

Figure 2:
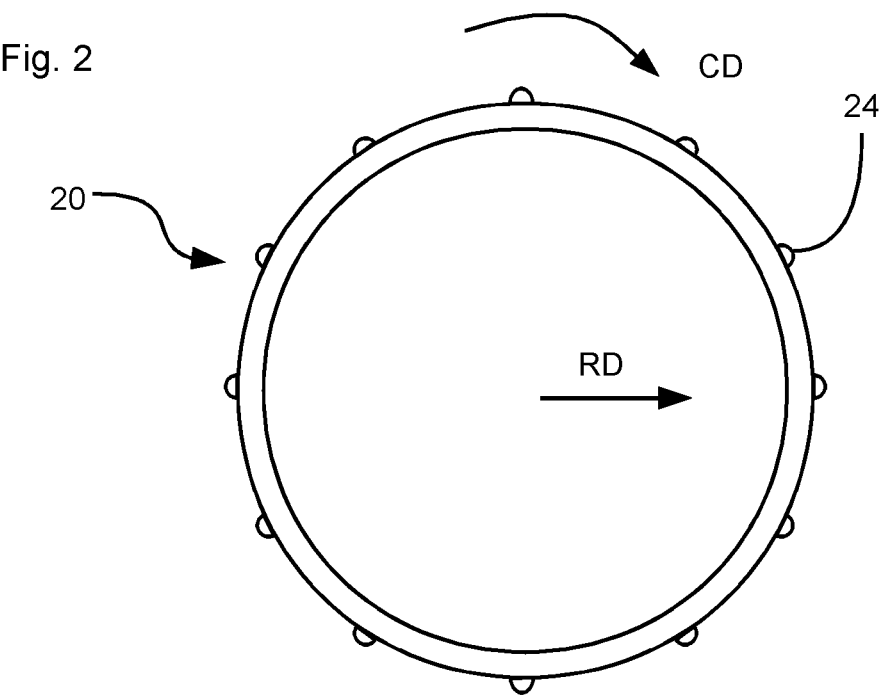
FIG. 2 shows one embodiment of a reinforcing member of the seal of FIG. 1 in a plan view along the axial direction.
Figure 3:
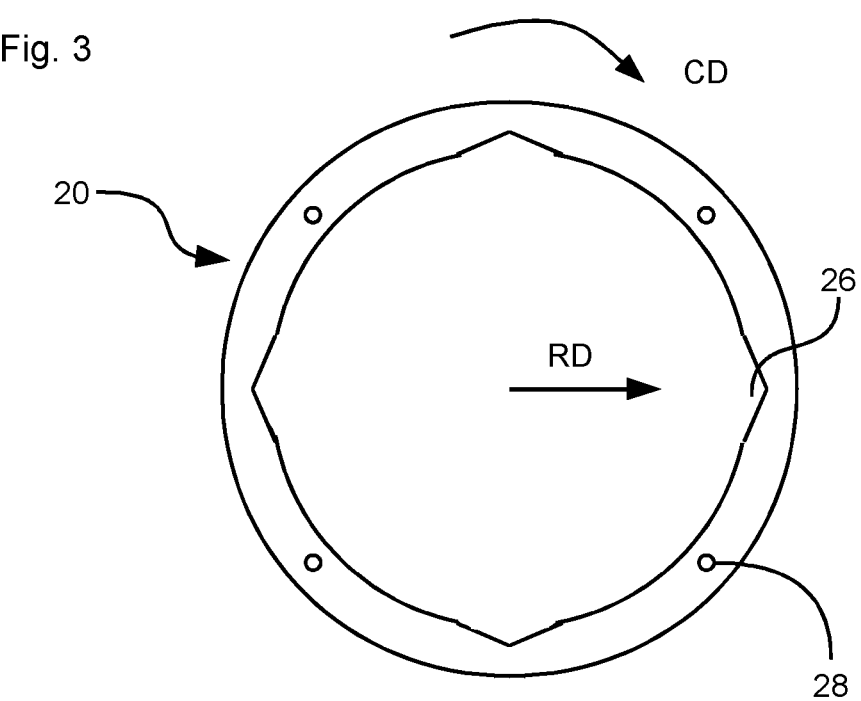
FIG. 3 shows another embodiment of the reinforcing member of the seal according to FIG. 1 in a plan view along the axial direction.

The reinforcing member 20 has an annular shape as shown in FIGS. 2 and 3. The reinforcing member 20 is rigid, albeit flexible enough to be adaptable to pressure applied to the seal 14 or to deformations of the pipe 12 due to pressure in the pipe 12. The reinforcing member 20 of FIG. 2 is provided with a plurality of protrusions 24. The protrusions 24 are formed by a plurality of nubs arranged on a radially outer side of the reinforcing member 20. The protrusion 24, in particular the nub, may have a circular cross-section in a plan view on the protrusion 24. The protrusions 24 are formed as hemispheres and have a constant height. The protrusions 24 are evenly distributed along a circumferential direction CD.

The circumferential direction CD is perpendicular to a radial direction RD and an axial direction AD, both with reference to the pipe 12 and the seal 14, respectively.

As shown in FIG. 3, another embodiment of the reinforcing member 20 comprises several recesses 26. The recesses 26 are formed as cut-outs arranged at a radially inner edge of the reinforcing member 20. The recesses 26 extend in the axial direction AD. The recesses 26 are evenly distributed along the circumferential direction CD.

A positioning device 28 is arranged on one side of the reinforcing member 20. The positioning device 28 comprises four supporting units which each have a rod shape. The supporting units protrude from the reinforcing member 20 in the axial direction AD. The supporting units have a constant height. The positioning device 28 is fixed to the reinforcing member 20 or is a unitary piece with the reinforcing member 20.

Figure 4:
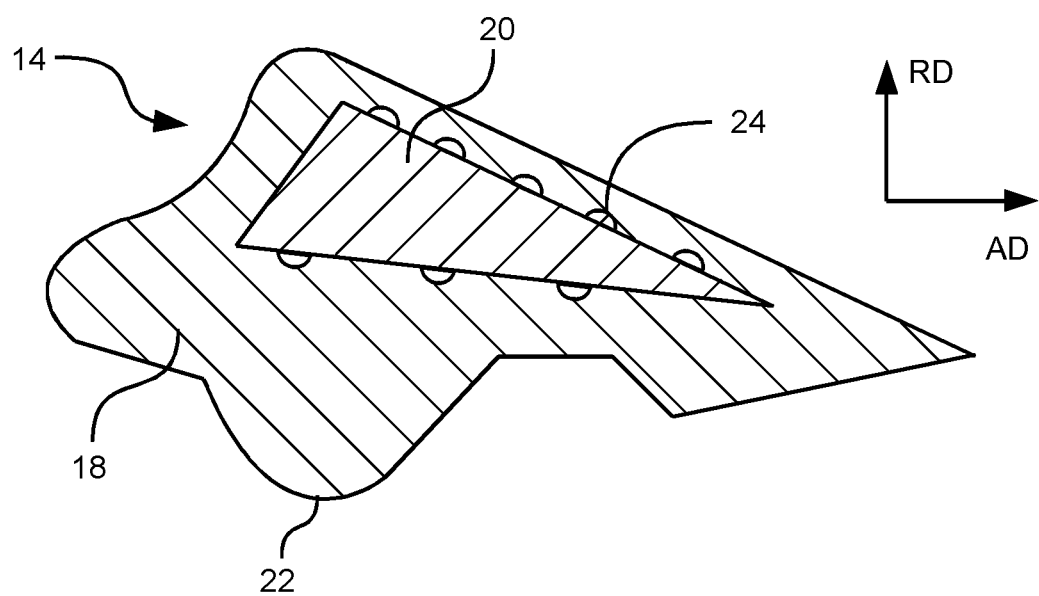
FIG. 4 shows a cross-sectional view of a seal according to another embodiment.
Figure 8A:
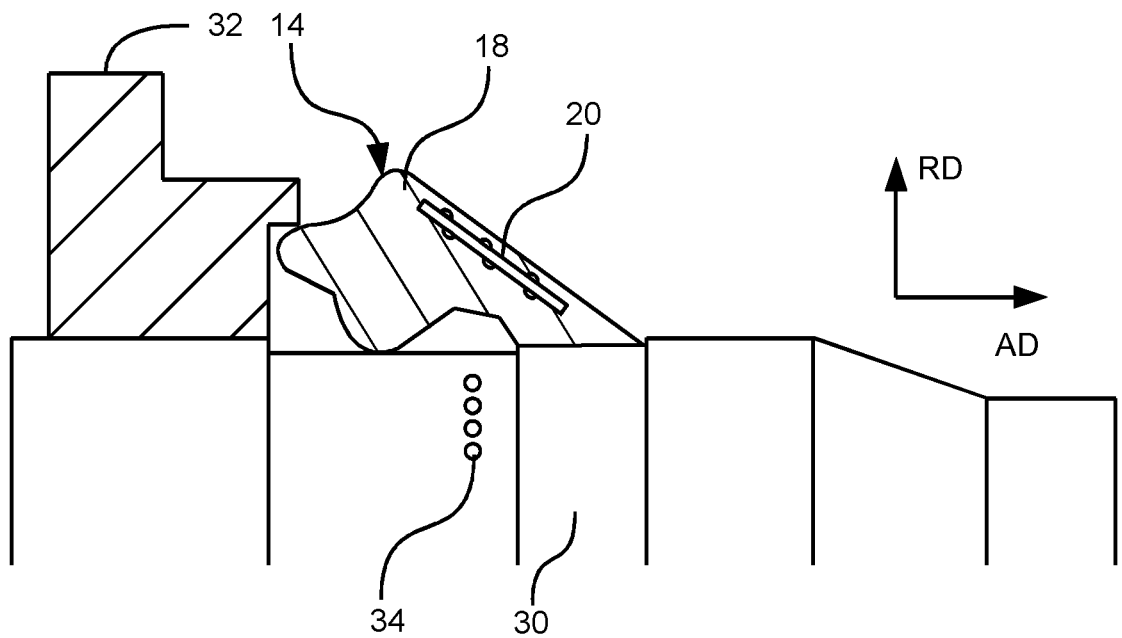

Another embodiment of the seal 14 is shown in FIG. 4. The sealing member 18 has a similar form as shown in FIG. 8a and FIG. 1. The sealing member 18 has an annular shape. The reinforcing member 20 has a triangular shape in a cross-sectional view. The reinforcing member 20 comprises several protrusions 24 that protrude from two opposing sides of the reinforcing member 20. The protrusions 24 have a semi-circular shape in a cross-sectional view. The protrusions 24 each have the same height and may be configured as hemispheres or rips.

The reinforcing member 20 has a surface which extends parallel to an exterior surface of the sealing member 18. In particular, the surface of the reinforcing member 20 as well as the exterior surface of the sealing member 18 are parallel to the second side wall 16b of the groove 16.

FIG. 5 shows another embodiment similar to the one of FIG. 4. The only difference is that no protrusions 24 are present with the reinforcing member 20, but recesses 26. The recesses 26 have a semi-circular cross-section. The recesses 26 may extend completely along the circumference of the reinforcing member 20 or can be shaped as a hemisphere in the reinforcing member 20.

The positioning device 28 is provided with the seals 14 of the embodiment of FIG. 5. The positioning device 28 comprises three positioning units configured by rods. In the configuration shown in FIG. 5, the positioning units are a unitary member with the reinforcing member 20.

FIG. 6 shows another embodiment of the seal 14. The seal 14 is identical to the seal 14 of FIG. 4 except that the reinforcing member 20 does not have a triangular shape but a rectangular shape in a cross-sectional view. Here again, one surface of the reinforcing member 20 extends parallel to an exterior surface of the sealing member 18.

Figure 7:
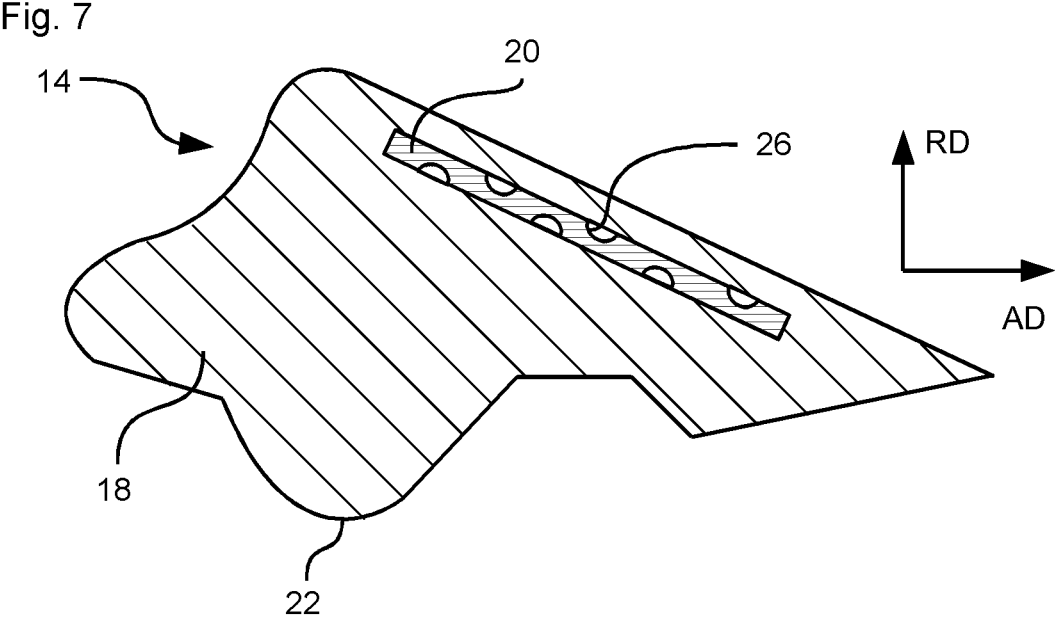
FIG. 7 shows a cross-sectional view of a seal according to another embodiment.

FIG. 7 shows another embodiment of the seal 14. The seal 14 is identical to the seal 14 of FIG. 6 except that a recess 26 is provided instead of a protrusion 24. The recesses 26 have a semi-circular cross-section. The reinforcing member 20 has a rectangular shape in a cross-sectional view. The recesses 26 may extend completely along the circumference of the reinforcing member 20 or can be shaped as a hemisphere in the reinforcing member 20. One surface of the reinforcing member 20 extends parallel to an exterior surface of the sealing member 18.

FIGS. 8a to 8e show a method for manufacturing the pipe assembly 10. To this end, the seal 14, in this embodiment the seal 14 of FIG. 6, is arranged on a working surface of a mandrel 30 as depicted in FIG. 8a. Furthermore, a backup collar 32 is arranged on the mandrel 30. The seal 14 is arranged on the mandrel 30 in such a way that it contacts the backup collar 32.

Figure 8B:
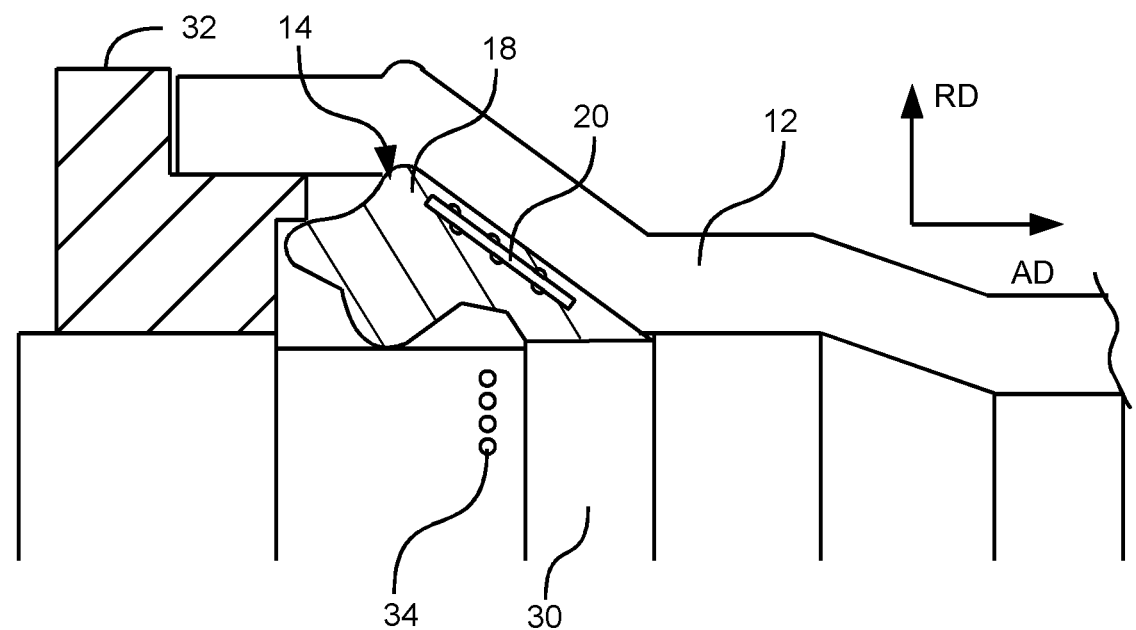

As shown in FIG. 8b, the mandrel 30 is heated up such that the part of the pipe 12 that is pushed over the mandrel 30 is heated up such that the end part of the pipe 12 becomes flexible. The pipe 12 is made from a plastic material such as PVC which becomes moldable when heated up. A socket end of the pipe 12, which becomes the bell end 12a of the pipe 12, is pushed over the seal 14. In particular, the exterior surface of the sealing member 18 to which a surface of the reinforcing member 20 runs parallel, is arranged on that side over which the pipe 12 is forced over. Due to this configuration of the reinforcing member 20, the seal 14 is reinforced in order to withstand the force applied on the seal 14 when the socket end of the pipe 12 is pushed over.

As a next step, as shown in FIG. 8c, the backup collar 32 is removed.

Subsequently, the heated pipe 12 is pressed against the mandrel 30 by using negative pressure which is generated by means of vacuum holes 34 arranged in the working surface of the mandrel 30 (see FIG. 8d). The heated bell end 12a of the pipe 12 is cooled, for example, by spraying water on the heated end of the pipe 12. As a last step, as shown in FIG. 8e, the mandrel 30 is removed from the bell end 12a of the pipe 12.

Figure 9A:
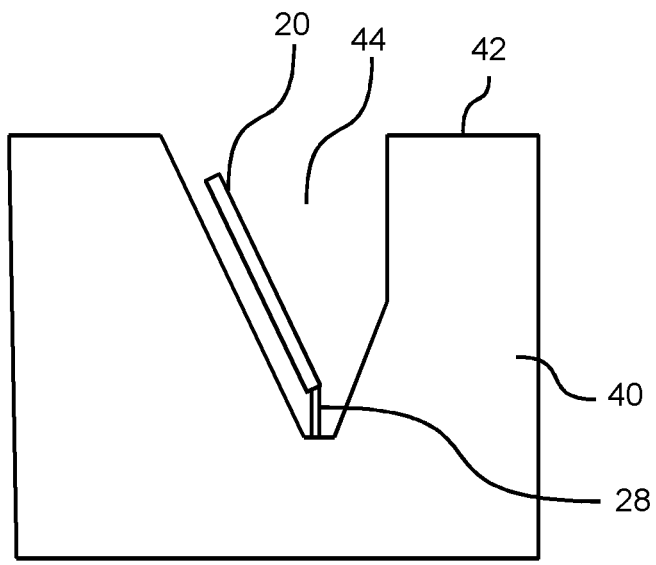
FIGS. 9a and 9b show steps for manufacturing the seal.
Figure 9B:
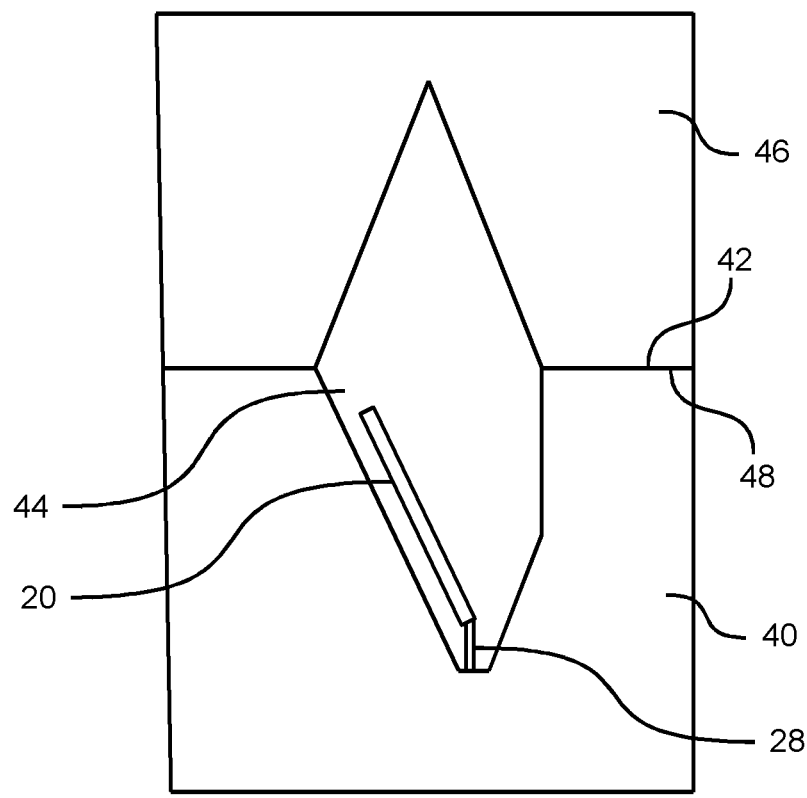

FIGS. 9a and 9b show two steps of a method for manufacturing the seal 14. At first as depicted in FIG. 9a, a first mold 40 having a first mold face 42 and a circumferential recess 44 are provided. The contour of the circumferential recess 44 corresponds to the contour of the sealing member 18 of the seal 14. The reinforcing member 20 is arranged in the circumferential recess 44 such that the reinforcing member 20 does not contact the first mold 40. To this end, the positioning device 28 is used for providing a gap between the reinforcing member 20 and the first mold 40. For example, the reinforcing member 20 is supported within the circumferential recess 44 by means of the positioning device 28.

As a next step, a second mold 46 is placed on the first mold 40. In particular, a second mold face 48 is placed on the first mold face 42 such that a closed space surrounded by the first mold 40 and the second mold 46 is provided. This space is pressure-injected with liquefied plastic material of the sealing member 18.

Subsequently, the first mold 40 and the second mold 46 are applied with heat and pressure to form the annular sealing member 18. Due to the positioning of the reinforcing member 20 spaced apart from the circumferential recess 44, the reinforcing member 20 is fully embedded within the sealing member 18. As a last step, the seal 14 is removed from the first mold 40 and the second mold 46 by separating the first mold 40 from the second mold 46.

LIST OF REFERENCE SIGNS 10 pipe assembly
12 pipe
12a bell end
14 seal
16 groove
16a first side wall
16b second side wall
18 sealing member
20 reinforcing member
22 sealing lip
24 protrusion
26 recess
28 positioning device
30 mandrel
32 backup collar
34 vacuum hole
40 first mold
42 first mold face
44 circumferential recess
46 second mold
48 second mold face
AD axial direction
CD circumferential direction
RD radial direction

The invention claimed is:

1. A pipe seal suitable for use in a Rieber joint, the seal comprising:
   an annular sealing member including exterior surfaces; and
   an annular reinforcing member completely embedded in the sealing member, the reinforcing member made of a rigid plastic band;
   wherein the reinforcing member includes, for increasing an area of contact between the sealing member and the reinforcing member, protrusions arranged on two opposing side walls of the reinforcing member and/or recesses arranged on the two opposing side walls of the reinforcing member;
   wherein the protrusions and/or the recesses are spaced disposed at a distance from the exterior surfaces of the sealing member.

2. The seal of claim 1, wherein the reinforcing member has a triangular shape or a rectangular shape in a cross-sectional view of the seal.

3. The seal of claim 1, wherein the protrusions comprise at least one nub.

4. The seal of claim 1, wherein the recesses are formed by a cut-out at an edge of the reinforcing member.

5. The seal of claim 1, wherein the protrusions and the reinforcing member are integrally formed.

6. The seal of claim 1, wherein the reinforcing member comprises a surface that at least partially extends along an exterior surface of the sealing member.

7. The seal of claim 1, comprising at least one positioning device for positioning the reinforcing member in a mold, the positioning device extending from the reinforcing member to an exterior surface of the sealing member.

8. The seal of claim 7, wherein the positioning device comprises at least three positioning units having a rod shape.

9. The seal of claim 7, wherein the positioning device is integrally formed with the reinforcing member.

10. A pipe assembly, comprising:
    a seal comprising an annular sealing member having exterior surfaces, an annular reinforcing member completely embedded in the sealing member, the reinforcing member made of a rigid plastic band, the reinforcing member including, for increasing an area of contact between the sealing member and the reinforcing member, protrusions arranged on two opposing side walls of the reinforcing member and/or recesses arranged on the two opposing side walls of the reinforcing member, and the protrusions and/or recesses are spaced from the exterior surfaces of the sealing member; and
    a pipe having an annular groove in which the seal is located.

11. A method for forming a pipe assembly, comprising the steps of:
    providing a mandrel having an outer working surface;
    positioning a seal on the working surface, the seal comprising an annular sealing member including exterior surfaces, an annular reinforcing member completely embedded in the sealing member, the reinforcing member made of a rigid plastic band, the reinforcing member including, for increasing an area of contact between the sealing member and the reinforcing member, protrusions arranged on two opposing side walls of the reinforcing member and/or recesses arranged on the two opposing side walls of the reinforcing member, and the protrusions and/or recesses are spaced from the exterior surfaces of the sealing member;
    heating a socket end of a plastic pipe;
    forcing the heated socket end of the plastic pipe over the seal positioned on the working surface such that the heated socket end of the plastic pipe flows over the seal for forming a retention groove for retaining the seal;
    cooling the heated socket end of the plastic pipe; and
    removing the mandrel from the cooled socket end of the plastic pipe.

12. A method for manufacturing a seal suitable for use in a Rieber joint, comprising the steps of:
    providing a first mold having including a first mold face with a circumferential recess;
    placing a reinforcing member made of a rigid plastic band in the circumferential recess, the reinforcing member including protrusions arranged on two opposing side walls of the reinforcing member, wherein the reinforcing member is placed in the recess such that there is a gap between the protrusions and the circumferential recess;

providing a second mold including a second mold face;

uniting the first mold face and second mold face;

injecting a material of a sealing member into the circumferential recess; and applying heat and/or pressure to the first mold and/or the second mold to form the annular sealing member in which the reinforcing member is fully embedded.

13. The method of claim 12, wherein the step of placing the reinforcing member in the circumferential recess is executed by providing a positioning device in the circumferential recess on which the reinforcing member lies in the circumferential recess.

* * * * *